Aug. 24, 1943.  L. W. FALK  2,327,777
GEAR HOUSING
Filed May 23, 1941  2 Sheets-Sheet 1

INVENTOR
Louis W. Falk
BY
ATTORNEY

Aug. 24, 1943.   L. W. FALK   2,327,777
GEAR HOUSING
Filed May 23, 1941   2 Sheets-Sheet 2
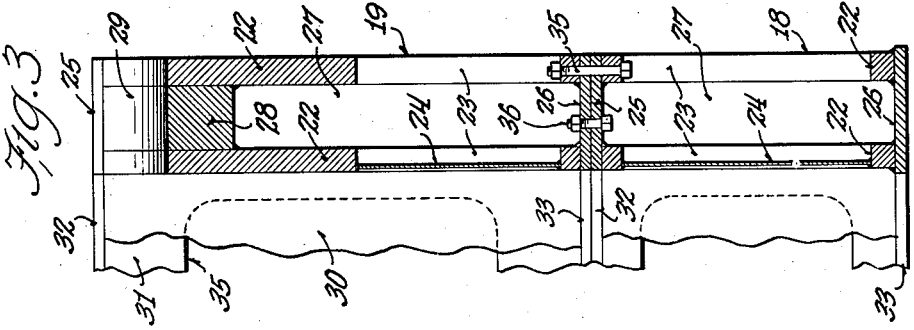
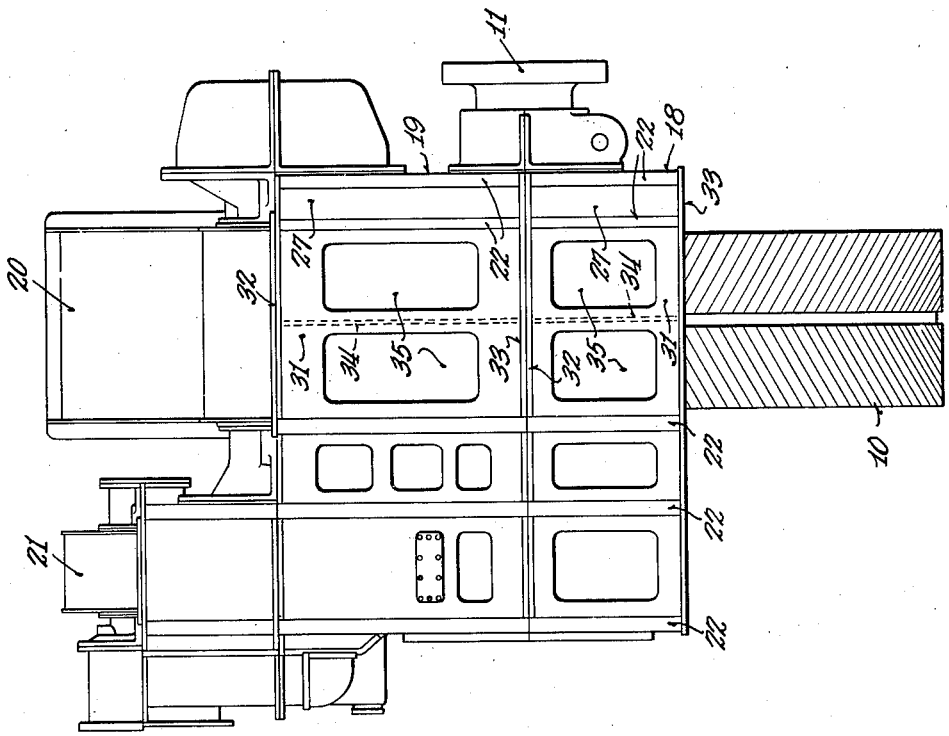
INVENTOR
Louis W. Falk
BY
ATTORNEY Patented Aug. 24, 1943

2,327,777

UNITED STATES PATENT OFFICE 2,327,777

GEAR HOUSING

Louis W. Falk, Milwaukee, Wis., assignor to The Falk Corporation, Milwaukee, Wis., a corporation of Wisconsin Application May 23, 1941, Serial No. 394,777

7 Claims. (Cl. 74—606)

This invention relates to fabricated housings for heavy duty gear sets.

Developments in the welding art have made it economically feasible to fabricate gear set housings by welding together steel parts cut and formed to desired shapes. In fact such methods of producing gear set housings have largely supplanted the casting methods heretofore employed. This is particularly true of housings for gear sets of the type employed in heavy duty marine and industrial drives.

Sheet steel has largely been employed in the fabrication of welded housings of this type. In the housings of marine turbine reduction gears, for instance, the main vertical walls which serve to support and sustain the weight and operating loads on the gears have heretofore been formed of rather thin steel side plates spaced apart and interconnected by numerous horizontal and vertical web plates welded to and between them in such manner as to form a hollow cellular wall structure. The production of such walls involves a great deal of expensive skilled labor. Holes cut in the outer side plates afford access to the interior of these walls, but nevertheless it is extremely difficult to make sound welds between the inner webs and side plates, since access thereto is distinctly limited and the welder is in many instances severely handicapped by inability to observe his work. As heretofore constructed, the design is characterized by a great number of small pieces and a great deal of laborious and difficult welding in joining those pieces together into a complete structure.

An object of the present invention is to provide a welded gear housing having main walls of sturdy, rigid, and stiff, yet light weight construction, and which may be more readily and economically produced than those heretofore designed.

Other more specific objects and advantages will appear, expressed or implied, from the following description of a gear housing constructed in accordance with the present invention.

In the accompanying drawings:

Fig. 2 is a side elevation.

Fig. 3 is a fragmentary sectional view on a larger scale taken substantially along the line 3—3 of Fig. 1.

Figure 1:
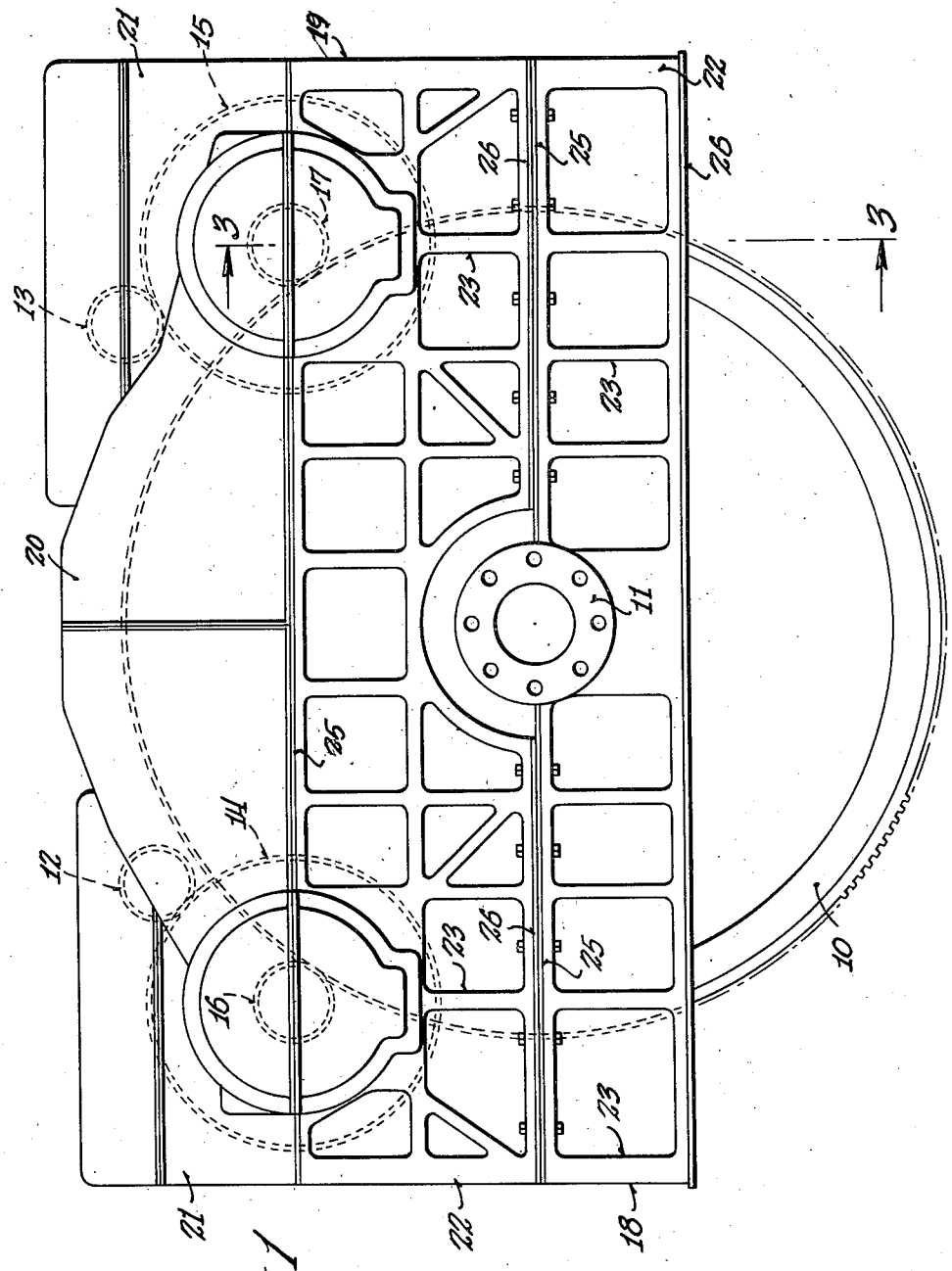
Figure 1 is a rear elevation of a marine turbine-driven gear set enclosed within a housing embodying the present invention.

The gear set shown comprises a conventional gear train including a main low-speed gear 10 carried by a shaft having one end 11 flanged or otherwise fashioned for direct connection to a propeller shaft driven thereby. The gear train also includes two high speed pinions 12 and 13 driven by separate turbines and meshing with intermediate gears 14 and 15, respectively. The gears 14 and 15 are carried by separate intermediate shafts, not shown, to which are coupled pinions 16 and 17, both of which mesh with and drive the main gear 10. The parts thus far referred to are of any standard or approved construction and need no further description.

In this instance, the housing for the gear train comprises a substantially rectangular base section 18 which supports the weight of the entire mechanism, and an upper section 19 seated upon and bolted or otherwise fixed to the base section. The upper section is closed at the top by a cover section 20 shaped to accommodate the main gear 10 and meshing pinions 16 and 17, and also by auxiliary housings 21 shaped to support and enclose the meshing pinion and gear 12—14 and the meshing pinion and gear 13—15, respectively. The base section is closed at the bottom by an appropriate depending pan (not shown) shaped to accommodate the main gear 10 and to form a lubricant reservoir therebeneath. The loads sustained by the pan and cover sections are relatively light and they may be made in any known or approved manner either by casting or by welding together steel pieces of appropriate shape.

The base section 18 and upper section 19, however, and particularly the main or side walls thereof, involve a novel light weight, yet stiff and sturdy, construction well adapted to sustain the severe stresses and loads to which they are subjected. The details of this construction are probably best illustrated in Fig. 3.

In this instance the main or side walls of each housing section are made up largely of pairs of horizontally spaced steel slabs 22 of sufficient thickness to afford lateral stability arranged on edge and extending from end to end of the section. Large areas of each of these slabs are cut away to provide a series of windows or openings 23 therein so shaped and arranged as to provide a relatively stiff truss-like formation of greatly reduced weight. The windows 23 in each inner slab are closed preferably by inserts 24 of sheet steel welded therein, so as to close the housing.

Each pair of wall-forming slabs 22 are rigidly connected along their upper margins by a strip 25 of steel welded thereto and spanning the space therebetween. The strips 25 are shown in Fig. 3 seated upon and welded to the upper edge faces of the slabs although they may be in the form of inserts welded to and between the opposed side faces of the slabs. The lower margins of each pair of wall-forming slabs are also similarly joined by a strip of steel 26 welded thereto. Each pair of wall-forming slabs are further rigidly connected by vertical steel webs 27 welded to and between the ends thereof and also by steel blocks or castings 28 welded to and between them at points intermediate their ends to form bearing supports for the shafting of the gear train. It will be noted that the block 28 appearing in the upper portion of Fig. 3, as well as adjacent portions of the slabs, are fashioned to provide a semi-circular seat 29 for a shaft bearing.

The end walls of each housing section serve merely to connect and brace the main side walls and to close the housing. Each may consist of a single sheet of steel or of two spaced sheets of steel 30 and 31 welded to and between the inner slabs of the side walls. When two sheets of steel are used they are securely joined at their upper and lower edges by steel strips 32 and 33 welded thereto, and they are preferably additionally braced by steel webs 34 judiciously placed and welded to and between them. Large windows 35 are preferably provided in the outer sheet 31 of steel to afford ready access to the space between the sheets for the purpose of carrying out the welding operations.

The housing sections may be releasably joined by any appropriate means such as bolts 35 accessibly disposed and extending through the adjacent edges of the outer slabs 22. The adjacent strips 25 and 26 of the sections thus joined are preferably further bound together by bolts 36 or the like to insure a tight joint between sections.

Various changes may be made in the embodiment of the invention hereinabove specifically described without departing from or sacrificing the advantages of the invention as defined in the appended claims.

I claim:

1. A gear housing having a main load bearing wall composed of a pair of parallel horizontally spaced thick upright metal slabs, each of said slabs having a series of windows formed therein to form a truss-like structure, means closing the windows in one of said slabs, and connector means welded to said slabs to rigidly unite the same.

2. A gear housing having a main load bearing wall composed of a pair of parallel horizontally spaced relatively thick upright truss-like members, and metal plates welded to and between said members along the upper and lower margins thereof to unite the same.

3. A gear housing having a main load bearing wall, said wall comprising a pair of parallel horizontally spaced relatively thick upright metal slabs, horizontally extending plates welded to said slabs along the upper and lower margins thereof to unite the same, each of said slabs having a series of relatively large windows formed therein to form a truss-like structure, and sheet material welded to one of said slabs to close the windows therein.

4. A gear housing having a main load bearing wall, said wall comprising a pair of parallel horizontally spaced relatively thick upright slabs of steel, strips of steel welded to said slabs adjacent the upper and lower edges thereof to unite the same, each of said slabs having a series of relatively large windows formed therein to form a truss-like structure, and plates welded to and within the windows of one of said slabs to close the same.

5. A gear housing having a main load bearing wall, said wall comprising a pair of parallel horizontally spaced relatively thick upright metal slabs, each having a series of windows formed therein to form a truss-like structure, means closing the windows in one of said slabs, connector means welded to said slabs to unite the same, and a block of metal interposed between and welded to said slabs to form a shaft-bearing support.

6. A gear housing having a main bearing wall, said wall comprising a pair of parallel horizontally spaced relatively thick upright truss-like members, metal connectors welded to and between said members to unite the same, and a metal block interposed between and welded to said members to form a shaft-bearing support.

7. A gear housing having upper and lower separable mating sections, each of said sections having a main load bearing wall comprising a pair of parallel horizontally spaced relatively thick upright truss-like members, means welded along and between the upper and lower margins of each pair of members to unite the same, and means for releasably joining the members of adjacent sections.

LOUIS W. FALK.